United States Patent
Itoh et al.

(10) Patent No.: US 8,355,308 B2
(45) Date of Patent: Jan. 15, 2013

(54) OPTICAL RECORDING MEDIUM AND RECORDING AND READING METHOD OF OPTICAL RECORDING MEDIUM

(75) Inventors: Hidetake Itoh, Tokyo (JP); Koji Mishima, Tokyo (JP); Takashi Kikukawa, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 12/005,405

(22) Filed: Dec. 26, 2007

(65) Prior Publication Data

US 2008/0151731 A1    Jun. 26, 2008

(30) Foreign Application Priority Data

Dec. 26, 2006   (JP) ................ 2006-349302

(51) Int. Cl.
*G11B 7/013*   (2006.01)
(52) U.S. Cl. .......... 369/94; 369/275.1; 369/275.2; 369/275.3
(58) Field of Classification Search .............. None
See application file for complete search history.

(56) References Cited

U.S. PATENT DOCUMENTS

| | | | |
|---|---|---|---|
| 4,989,195 A | 1/1991 | Suzuki | |
| 5,903,530 A | 5/1999 | Tateishi et al. | |
| 6,381,208 B1 | 4/2002 | Abe et al. | |
| 6,762,978 B2 | 7/2004 | Mishima et al. | |
| 7,688,705 B2 | 3/2010 | Shoji et al. | |
| 2003/0076775 A1* | 4/2003 | Sato et al. | 369/275.3 |
| 2004/0174803 A1* | 9/2004 | Carson | 369/275.4 |
| 2005/0036427 A1 | 2/2005 | Suh | 369/94 |
| 2005/0201260 A1* | 9/2005 | Kawaguchi et al. | 369/275.4 |
| 2006/0227695 A1* | 10/2006 | Nagaoka | 369/275.1 |
| 2007/0019533 A1* | 1/2007 | Ogawa et al. | 369/275.3 |
| 2007/0070843 A1* | 3/2007 | Kobayashi | 369/47.36 |
| 2007/0076544 A1* | 4/2007 | Sugaya et al. | 369/44.27 |
| 2008/0151730 A1* | 6/2008 | Kikukawa et al. | 369/94 |

FOREIGN PATENT DOCUMENTS

| | | |
|---|---|---|
| JP | 1989014731 A | 1/1989 |
| JP | 10143872 A | 2/1998 |
| JP | 2000315323 A | 11/2000 |
| JP | 2004118990 A | 4/2004 |
| JP | 2004213720 A | 7/2004 |
| JP | 2006024365 A | 1/2006 |
| JP | 2006/313628 | 11/2006 |
| JP | 2009015878 A | 1/2009 |
| WO | WO 2007049605 A1 | 5/2007 |

OTHER PUBLICATIONS

White Paper Blu-ray Disc (TM) Format—General—2nd Ed. Oct. 2010.

* cited by examiner

*Primary Examiner* — Joseph Feild
*Assistant Examiner* — Henok Heyi
(74) *Attorney, Agent, or Firm* — Porzio, Bromberg & Newman, P.C.

(57) ABSTRACT

An optical recording and reading method capable of enhancing the design flexibility of recording layers of an optical recording medium and performing accurate optical recording and reading operations. A basic recording layer is arranged in a position that is in the range of 90 μm to 110 μm away from a light incident surface of an optical recording medium, and recording layers are arranged in parallel with the basic recording layer. At least the position information of the recording layers is recorded in one of the basic recording layer and the recording layers.

8 Claims, 7 Drawing Sheets

OPTICAL RECORDING MEDIUM AND RECORDING AND READING METHOD OF OPTICAL RECORDING MEDIUM

BACKGROUND OF THE INVENTION

1. Field of the Invention

The present invention relates to an optical recording medium having a plurality of recording layers from which information is read by the irradiation of laser light and a recording and reading method of the optical recording medium.

2. Description of the Related Art

Blu-ray Discs have now become commercially available as high storage capacity optical recording medium. There are two types of Blu-ray Discs, namely, one that has a single recording layer and one that has two recording layers. In the Blu-ray Disc with the single layer, the recording layer is arranged in a position that is 100 µm away from the light incident surface. In the Blu-ray Disc with two layers, a basic recording layer is arranged in a position that is 100 µm away from the light incident surface, as is the case for the single layer type, and the other recording layer is arranged in a position that is approximately 25 µm away from the basic recording layer on the light incident surface side of the disk.

In the Blu-ray Disc with two recording layers, the arrangement of the basic recording layer is the same as that of the single layer described above in order to adhere to Blu-ray Disc standards. Conversely, the interlayer distances between the basic recording layer and the other recording layer is arbitrarily determined in consideration of crosstalk between the layers, a degree of allowance for scratches, dust, or fingerprints on the surface, a corrective range for spherical aberrations of an optical pickup, a tilt margin, and any errors in manufacturing. However, an interlayer distance of 25 µm between the two layers has already become the norm in effect in Blu-ray Disc standards, and it can be expected that various manufacturers will supply Blu-ray Discs with two recording layers having such a distance therebetween in the future (see, for example, Japanese Patent Application Laid-Open No. 2006-313628).

Furthermore, when there is a plurality of recording layers, in other words, when there are three or more recording layers in total including the basic recording layer, the effect of crosstalk, surface fingerprint, and the like is increased so that design of the disc becomes more complicated. It is necessary to increase light reflectivity in an L0 recording layer, which is the layer farthest away from the light incident surface, however, it is also necessary to increase light transmittance in the other recording layers (except for the L0 recording layer). In order to obtain favorable signal characteristics, the L0 recording layer and an L1 recording layer adjoining this L0 recording layer are preferably spaced as far away from each other as possible. If the interlayer distance is too large, the recording layer lying closest to the light incident surfaces comes so close to the light incident surface that it becomes susceptible to fingerprints and the like. Accordingly, in the case of the optical recording medium having three or more recording layers, factors affecting signal quality are complicatedly intertwined with one another, so that it is necessary for each manufacturer to individually design an optical recording medium while making use of proprietary technology and know-how in order to increase the signal quality in recording and reading. Thus, there is a problem in that, at present, it is difficult to share the standard position of each recording layer among a plurality of manufacturers.

However, if each manufacturer arbitrarily determines the position of each recording layer, an optical recording and reading apparatus will not know the position of each recording layer located on the Blu-ray Disc inserted into such. Accordingly, there may be a problem in that it takes time for the apparatus to achieve focus.

SUMMARY OF THE INVENTION

The present invention has been developed in view of the foregoing problems. It is thus an object of the present invention to provide an optical recording medium which can reduce operational delay and an error during recording and reading operations while increasing the flexibility of design of the optical recording medium and to provide a recording and reading method of the optical recording medium.

The inventors have made intensive studies and achieved the foregoing object with the following means.

A first aspect of the present invention is an optical recording medium includes: a basic recording layer arranged in a position that is in the range of 90 µm to 110 µm away from a light incident surface, with information being read from the basic recording layer by the irradiation of laser light that is incident on the light incident surface; and a plurality of recording layers arranged in parallel with the basic recording layer, with information being read from the recording layer by the irradiation of the laser light that is incident on the light incident surface. In the optical recording medium, at least position information of the recording layer is recorded in any one of the basic recording layer and the plurality of recording layers.

The optical recording medium according to the first aspect of the present invention, wherein the position information is recorded in a lead-in area or a lead-out area of any one of the basic recording layer and the plurality of recording layers.

The optical recording medium according to the first aspect of the present invention, wherein the position information is recorded in a plurality of recording layers selected from the basic recording layer and the plurality of recording layers.

The optical recording medium according to the first aspect of the present invention, wherein the position information is recorded in the basic recording layer.

A second aspect of the present invention is an a recording and reading method of an optical recording medium, in which an optical recording and reading apparatus for an optical recording medium stores medium identification information for identifying a plurality of optical recording media and position information of a recording layer of the optical recording medium in advance on memory means, the method including the steps of: when an optical recording medium having three or more recording layers is mounted on the optical recording and reading apparatus, allowing the optical recording and reading apparatus to irradiate the recording layer of the optical recording medium with laser light in order to read out medium identification information stored on the recording layer in advance; allowing the optical recording and reading apparatus to refer to the position information stored in the memory means based on the medium identification information; and allowing the optical recording and reading apparatus to carry out focus control on the recording layer based on the position information in order to record or read information.

In this recording and reading method of an optical recording medium according to the second aspect of the present invention, wherein the medium identification information is recorded in a burst cutting area of the recording layer of the optical recording medium.

In this recording and reading method of an optical recording medium according to the second aspect of the present invention, wherein the medium identification information is recorded in a basic recording layer which is arranged in a position that is in the range of 90 μm to 110 μm away from a light incident surface of the optical recording medium.

The present invention can achieve a superior effect where flexibility in design is increased with respect to the positions of recording layers of the optical recording medium and hence a high quality optical recording medium can be provided.

BRIEF DESCRIPTION OF THE DRAWINGS

The above and other objects, features and advantages of the present invention will become apparent from the following description and appended claims, taken in conjunction with the accompanying drawings.

DETAILED DESCRIPTION OF THE PREFERRED EMBODIMENTS

Embodiments of the present invention will be described in detail with reference to the accompanying drawings.

Figure 1:
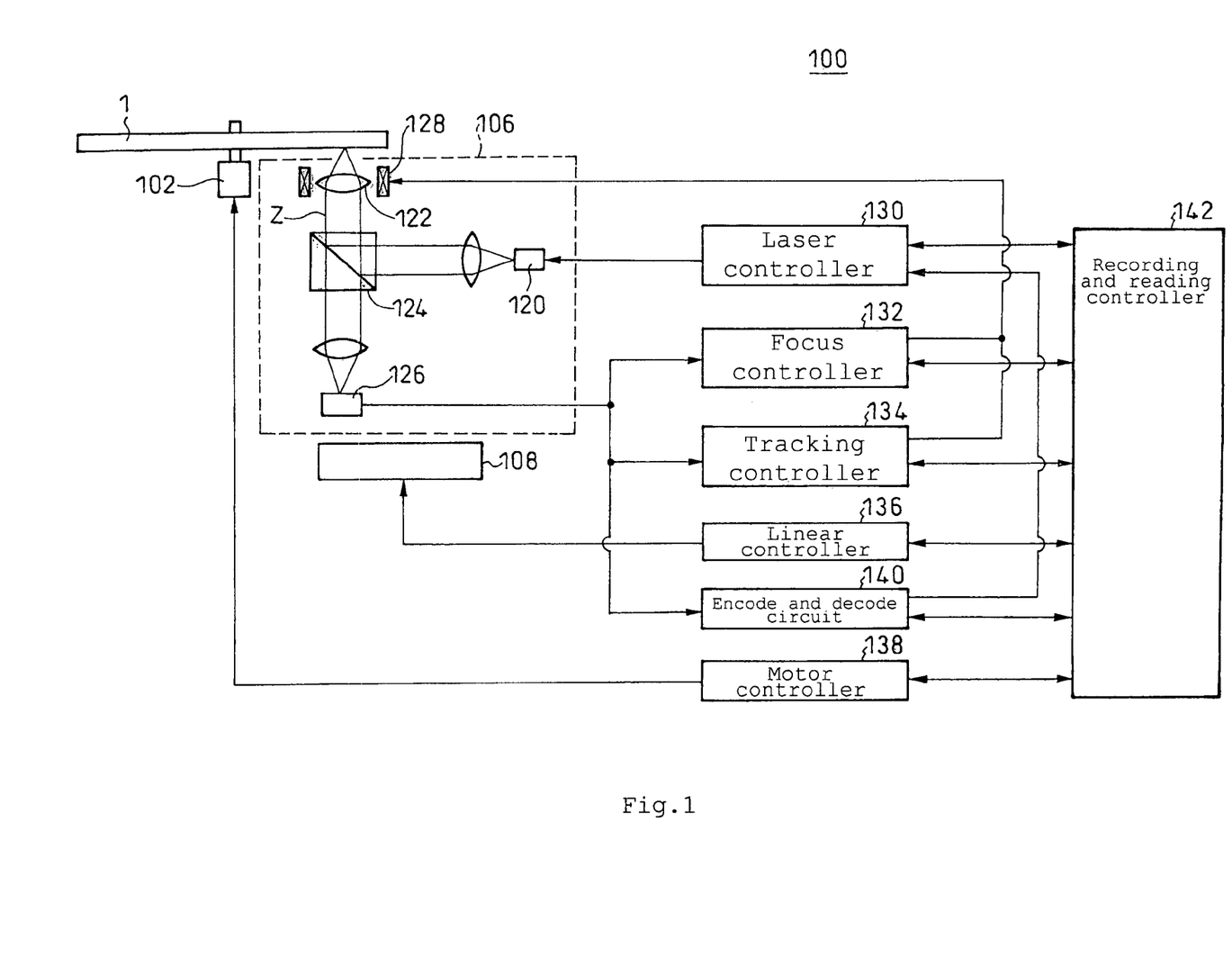
FIG. 1 is a diagram showing the general configuration of an optical recording medium and an optical recording and reading apparatus according to a first embodiment of the present invention.

FIG. 1 shows an optical recording medium 1 according to a first embodiment of the present invention and an optical recording and reading apparatus 100 which can record and read information on and from the optical recording medium 1. The optical recording and reading apparatus 100 is provided with a motor 102, an optical pickup 106, and a linear drive mechanism 108. The motor 102 rotates an optical recording medium 1. The optical pickup 106 irradiates the optical recording medium 1 with a beam spot to record and read information. The linear drive mechanism 108 linearly drives the optical pickup 106 in a radial direction of the optical recording medium 1. The optical recording medium 1 is a multilayer optical recording medium which has a plurality of recording layers for recording information on.

The optical pickup 106 is provided with a laser light source 120, an objective lens 122, a half mirror 124, a photo-detection device 126, and a lens drive coil 128. The optical pickup 106 can adjust the focus of the laser light Z on the recording layer of the optical recording medium 1.

The laser light source 120 is a semiconductor laser which generates the laser light Z for both recording and reading. The objective lens 122 forms the minute beam spot by narrowing the focus of the laser light Z and irradiates the specific recording layer with it. The half mirror 124 takes out reflected light from the recording layer and directs it to the photo-detection device 126. The photo-detection device 126, being a photodetector, receives the reflected light of the laser light Z and converts it into an electrical signal. The lens drive coil 128 shifts the objective lens 122 to the direction of the optical axis and to a tracking direction.

Furthermore, the optical recording and reading apparatus 100 is provided with a laser controller 130, a focus controller 132, a tracking controller 134, a linear controller 136, a motor controller 138, a encode and decode circuit 140, and a recording and reading controller 142. The laser controller 130 controls the driving of the laser light source 120 of the optical pickup 106 on the basis of directions received from the encode and decode circuit 140 and the recording and reading controller 142. The focus controller 132 detects a focus error (FE) based on the electrical signal sent from the photo-detection device 126 and controls the drive of the lens drive coil 128 in a focus direction (being the direction of the optical axis) with the use of the focus error. The tracking controller 134 detects a tracking error on the basis of the electrical signal sent from the photo-detection device 126 and controls the drive of the lens drive coil 128 in the tracking direction with the use of the tracking error. The tracking controller 134 also has the function of transmitting tracking error information to the recording and reading controller 142 and to the linear controller 136. Accordingly, it is possible to make the beam spot follow a recording track using the tracking control of the lens drive coil 128 and the linear drive of the whole optical pickup 106 using the linear controller 136. The linear controller 136 controls the drive of the linear drive mechanism 108 which is composed of a linear motor and the like, and slides the optical pickup 106 in the radial direction of the optical recording medium 1. The motor controller 138 controlling the rotational speed of the motor 102 rotates the optical recording medium 1 using the zone CLV method in this instance. A CLV method is a recording method by which the optical pickup 106 moves with constant linear velocity on the optical recording medium 1, in other words, the number of revolutions per minute is gradually reduced from the inner circumference to the outer circumference of the optical recording medium 1. In addition to this, the zone CLV divides the recording layer of the optical recording medium 1 into several areas (zones) from the inner circumference outwards and information is recorded by the CLV method on a zone-by-zone basis.

The encode and decode circuit 140 has a encode function and a decode function. As the decode function, the encode and decode circuit 140 decodes the electrical signal sent from the photo-detection device 126 into a digital signal and transmits the digital signal to the recording and reading controller 142. As the encode function, the encode and decode circuit 140 subjects a digital signal for recording sent from the recording and reading controller 142 to a pulse modulation and transmits an electrical signal after modulation to the laser controller 130. The recording and reading controller 142 for integrally controlling the entire control device controls various kinds of controllers, drivers, and the like by using a CPU and a buffer memory, which are not especially illustrated, and also carries out the input and output of recording and reading information to a host computer.

In the recording and reading apparatus 100, the wavelength $\lambda$ of the laser light Z is set to a value in the range of 400 to 410 nm and the initial reading power of the laser light Z is set to a value in the range of 0.3 to 2.0 mW. The numerical aperture NA of the objective lens 122 in the optical pickup 106 is set to a value in the range of 0.70 to 0.90. Accordingly, the spot diameter (λ/NA) of the laser light Z is set to a value in the range of 444 nm to 586 nm.

In order to record information on the optical recording medium 1, the laser light Z is generated from the laser light source 120 by the recording power and the specific recording layer of the optical recording medium 1 is irradiated with the beam spot. In order to read the information, on the other hand, the laser light Z is generated from the laser light source 120 by the reading power and the recording layer of the optical recording medium 1 is irradiated with the laser light Z. In the case of both recording and reading, the laser light Z which is reflected from the recording layer and is taken out through the optical pickup 106 becomes an electrical signal in the photodetection device 126. The electrical signal becomes a digital signal by passing through the encode and decode circuit 140.

Figure 2A:
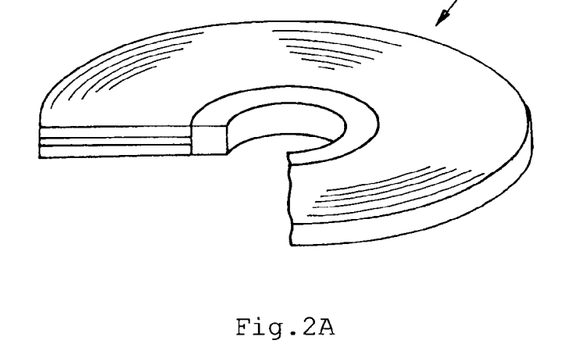
FIGS. 2A and 2B are enlarged views showing the configuration of the optical recording medium.
Figure 2B:
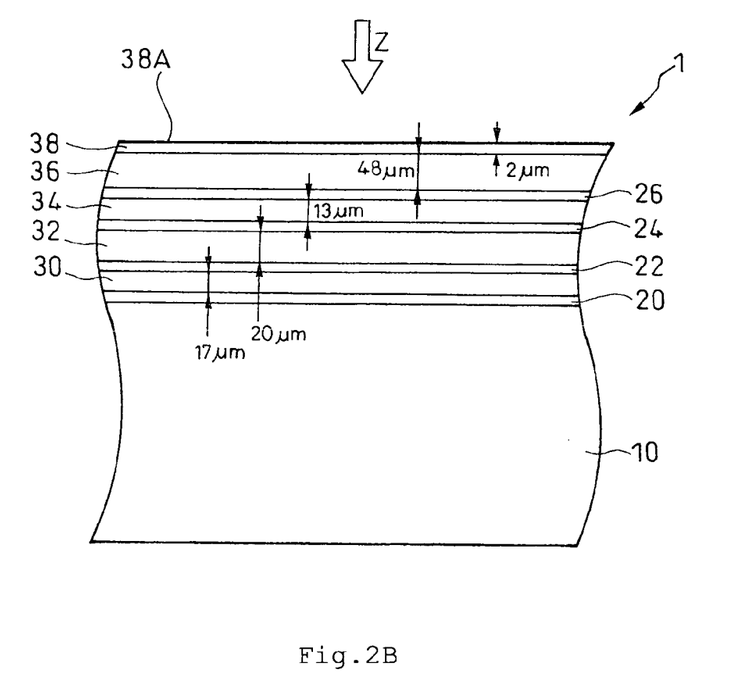

The optical recording medium 1 used for the reading operation by the recording and reading apparatus 100 will now be described. First, with reference to FIG. 2A, the optical recording medium 1 is a disc shaped with a diameter of approximately 120 mm and a thickness of approximately 1.2 mm. As shown in FIG. 2B by enlargement, the optical recording medium 1, being the multilayer medium with four recording layers, is composed of a substrate 10, an L0 recording layer 20 serving as a basic recording layer, a first spacer layer 30, an L1 recording layer 22, a second spacer layer 32, an L2 recording layer 24, a third spacer layer 34, an L3 recording layer 26, a cover layer 36, and a hard coat layer 38 which are stacked in this order.

The substrate 10 is a disc-shaped member with a thickness of approximately 1.1 mm. The material of the substrate 10 may be made of various materials such as, for example, glass, ceramic, and resin. A polycarbonate resin is used in this instance. The resin may also be an olefin resin, an acrylic resin, an epoxy resin, a polystyrene resin, a polyethylene resin, a polypropylene resin, a silicon resin, a fluorine resin, an ABS resin, an urethane resin, or the like in addition to the polycarbonate resin. Of the resins described above, the polycarbonate resin and the olefin resin are preferable due to the fact that they are easily processed and molded. In the surface of the substrate 10 on the side on which the recording layer is located, a groove, a land, a pit row, and the like are formed in accordance with the desired application of the optical recording medium.

All of the first to third spacer layers 30, 32, and 34, the cover layer 36, and the hard coat layer 38 have optical transparency and incident laser light from the outside passes therethrough. As a result, using the laser light Z incident from a light incident surface 38A of the hard coat layer 38 makes it possible to record and read information on and from all of the L0 to L3 recording layers 20, 22, 24, and 26.

The first to third spacer layers 30, 32, and 34 which are deposited between the L0 to L3 recording layers 20, 22, 24, and 26 have the function of separating each of the recording layers 20, 22, 24, and 26. A groove (land), a pit row, and the like are formed in the surface of each of the spacer layers 30, 32, and 34 on the light incident surface 38A side. Various materials are available to form the first to third spacer layers 30, 32, and 34 but, as described above, it is necessary to use a material with optical transparency in order to allow the laser light Z to pass therethrough. It is also preferable to use, for example, an UV-curable acrylic resin.

In the optical recording medium 1, the thickness of the first spacer layer 30 is set at 17 μm, the thickness of the second spacer layer 32 is set at 20 μm, and the thickness of the third spacer layer 34 is set at 13 μm. Varying the thicknesses of the spacer layers 30, 32, and 34 from one another, as described above, makes it possible to reduce the interference of a read signal and hence reduce noise in a readout signal. The thickness of the hard coat layer 38 is set at 2 μm and the thickness of the cover layer 36 is set at 48 μm.

Accordingly, in the optical recording medium 1, the distance from the light incident surface 38A to the L3 recording layer 26 is approximately 50 μm, the distance from the light incident surface 38A to the L2 recording layer 24 is approximately 63 μm, the distance from the light incident surface 38A to the L1 recording layer 22 is approximately 83 μm, and the distance from the light incident surface 38A to the L0 recording layer 20 is approximately 100 μm. The L0 recording layer 20, being the basic recording layer, is arranged in a position that is in the range of 90 μm to 110 μm away from the light incident surface 38A. In the present embodiment, the storage capacity of the L0 recording layer 20 is set at 25 GB. Accordingly, the basic recording layer is compliant with the Blu-ray Disc standard. The L1 to L3 recording layers 22, 24, and 26 being the other recording layers, on the other hand, are arranged in parallel with the basic recording layer (L0 recording layer 20). In other words, the other recording layers are added to the basic recording layer to make the optical recording medium 1 into multilayer structure. The L0 recording layer 20 is the basic recording layer in the present embodiment, but the present invention is not limited thereto. For example, the L1 recording layer 22, the L2 recording layer 24, or the L3 recording layer 26 may be the basic recording layer as long as the recording layer is arranged in a position that is in the range of 90 μm to 110 μm away from the light incident surface 38A.

When information is recorded/read on/from the L0 recording layer 20, the L0 recording layer 20 is irradiated with the laser light Z through the L1 to L3 recording layers 22, 24, and 26. In a similar manner, when information is recorded/read on/from the L1 recording layer 22, the L1 recording layer 22 is irradiated with the laser light Z through the L2 and L3 recording layers 24 and 26. When information is recorded/read on/from the L2 recording layer 24, the L2 recording layer 24 is irradiated with the laser light Z through the L3 recording layer 26. When information is recorded/read on/from the L3 recording layer 26, the L3 recording layer 26 is directly irradiated with the laser light Z without passing through the other recording layers.

Figure 3A:
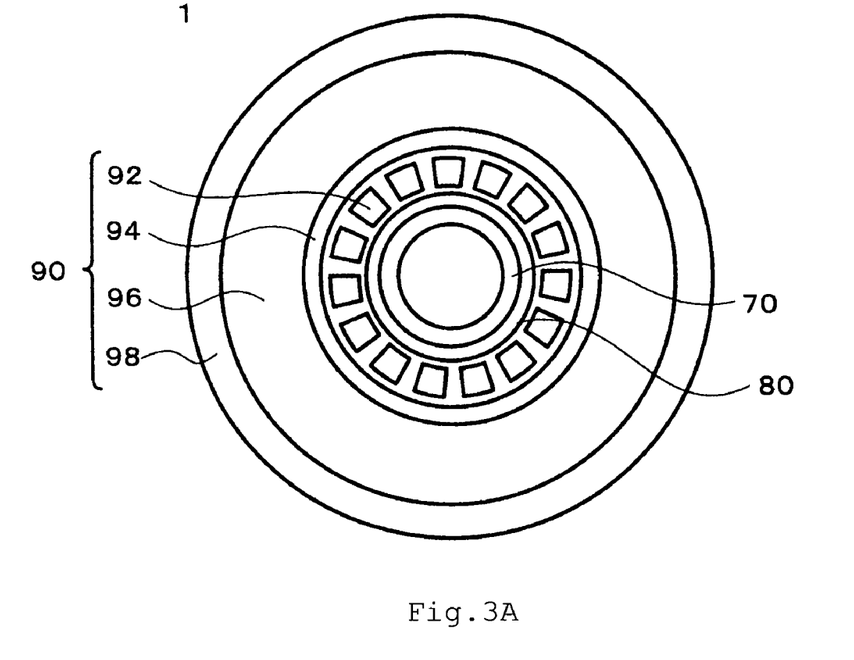
FIGS. 3A and 3B are diagrams showing the information holding form of the optical recording medium.

As shown in FIG. 3A, the optical recording medium 1 is divided into a clamping area 70, a transition area 80, and an information area 90. Each of the recording layers 20, 22, 24, and 26 corresponds to the information area 90. The information area 90 is further divided into a lead-in area 94, a data area 96, a lead-out area 98, and the like in detail. It should be noted that the L0 recording layer 20 being the basic recording layer has a burst cutting area (BCA) 92 in the inner circumference of the lead-in area 94. The lead-in area 94, the data area 96, and the lead-out area 98 are arranged in this order from the inner circumference to the outer circumference in the drawing, but this order of arrangement becomes reversed in accordance with the direction of information recording (spiral direction). In other words, when information is recorded from the outer circumference to the inner circumference, the lead-in area 94, the data area 96, and the lead-out area 98 are arranged in this order from the outer circumference to the inner circumference.

Figure 3B:
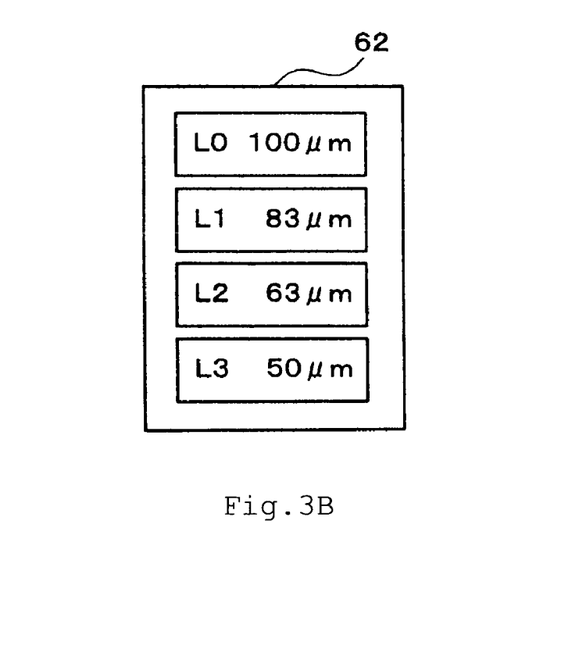

Furthermore, in the optical recording medium 1, as shown in FIG. 3B, the position information 62 on the L0 to L3 recording layers 20, 22, 24, and 26 is recorded in the lead-in area 94 of each of the recording layers 20, 22, 24, and 26. In the present embodiment, the position information 62 includes information on the distances from the light incident surface 38A to each recording layer, that is, for the L0 recording layer 20: 100 µm, for the L1 recording layer 22: 83 µm, for the L2 recording layer 24: 63 µm, and for the L3 recording layer 26: 50 µm. While the position information 62 is recorded in the lead-in area 94 in this instance, it may be recorded in the lead-out area 98 or in the BCA 92. Information such as the recording density of each of the recording layers 20, 22, 24, and 26 is recorded in the burst cutting area (BCA) 92 or in the lead-in area 94 in advance.

The information holding form in the respective data areas 96 of the L0 to L3 recording layers 20, 22, 24, and 26 is the so-called recording type in which writing by a user is possible. The recording type, to be more specific, is divided into a write-once read-many type in which, if data has been written once in an area, new data is not rewritable in that area and a rewritable type in which, even if data has been written in an area, the data is erased and new data is rewritable in that area. The information holding form in the areas can be of either type. It should be noted, however, that the information holding forms of the recording layers 20, 22, 24, and 26 may also be different from one another.

Figure 4:
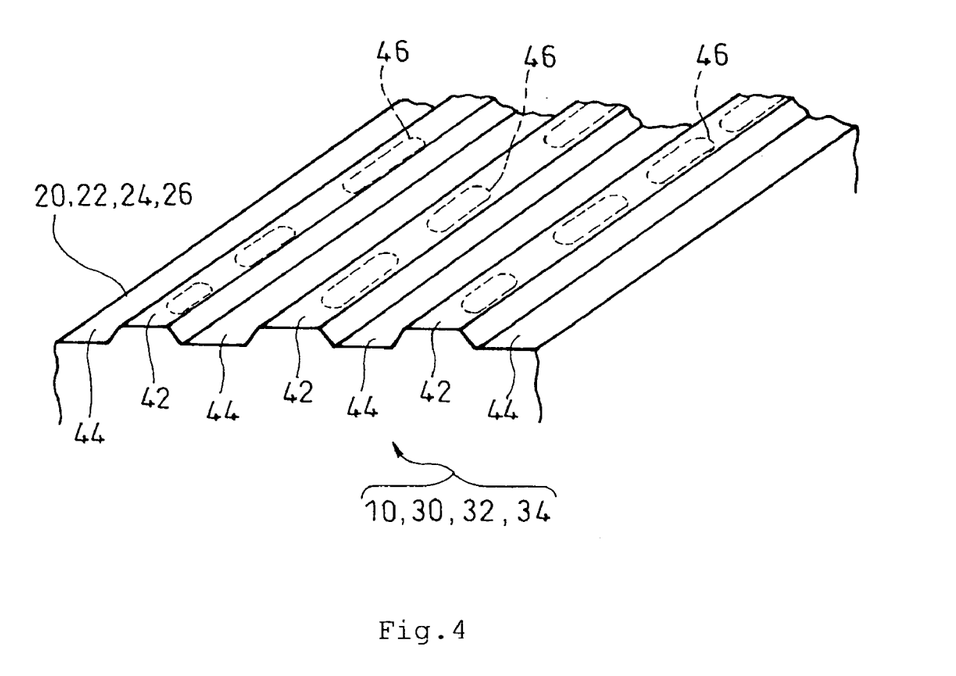
FIG. 4 is a diagram showing the groove structure of the optical recording medium.

As shown in FIG. 4, spiral grooves 42 (or lands 44) formed in the surfaces of the substrate 10 and the first to third spacer layers 30, 32, and 34 become the recording tracks of each of the recording layers 20, 22, 24, and 26. The spiral direction of each groove 42 is the same in the L0 recording layer 20 and the L2 recording layer 24, and the spiral direction of each groove 42 of the L1 recording layer 22 and the L3 recording layer 26 is opposite to that of the L0 recording layer 20 and the L2 recording layer 24. A recording film is formed in the L0 to L3 recording layers 20, 22, 24, and 26. The groove 42 acts as a guide track for the laser light Z during the recording of data. By modulating the intensity of the energy of the laser light Z proceeding along the groove 42, recording marks 46 are formed in the recording layers 20, 22, 24, and 26 on the groove 42. In the case of the write-once read-many type of data holding form, the recording marks 46 are irreversibly formed and cannot be erased. In the case of the rewritable type of data holding form, however, the recording marks 46 are reversibly formed and can be erased and formed again. The recording marks 46 are formed on the groove 42 in this instance, but may be formed on the land 44. Alternatively, the recording marks 46 may be formed on both the groove 42 and the land 44. The present embodiment provides a recording type case as an example, but the present invention is also applicable to a recording layer intended for reading operation only.

A method for recording and reading information on and from the optical recording medium 1 by the optical recording and reading apparatus 100 will now be described.

When recording information is inputted from the host computer to the recording and reading controller 142, the laser controller 130, the focus controller 132, the tracking controller 134, the linear controller 136, the motor controller 138, and the like are controlled in order to start recording. Furthermore, the recording and reading controller 142 successively reads out the BCA 92 and the lead-in area 94 which are in the information area 90 of the L0 recording layer 20 in the optical recording medium 1 in order to refer to the position information 62 stored in the lead-in area 94. As a result of this, the optical recording and reading apparatus 100 can recognize the position of each of the recording layers 20, 22, 24, and 26 in advance.

Consider that the L3 recording layer 26 is selected as the recording layer to start recording information on. Based on the position information 62 recognized in advance, the objective lens 122 is focus-controlled in the direction of the optical axis so that the laser light Z comes into focus on this L3 recording layer 26. Since the focus control is carried out in a state where the position information 62 is recognized in advance, the focus is approximately achieved from the beginning of the process. After that, the focus controller 132 detects an actual focus error (FE) based on an electrical signal sent from the photo-detection device 126 by reflected light and then precisely controls the drive of the lens drive coil 128 in the focus direction (being the direction of the optical axis) with the use of the focus error. Thus, any manufacturing errors and the like which cannot be determined by the position information 62 are adjusted. As a result, it is possible to extensively shorten the focus time of the L3 recording layer 26. Then, a test recording operation is carried out on the L3 recording layer 26. Furthermore, after completion of the test, the optical pickup 106 is positioned on a target recording track to start recording from, and recording is then started.

During the recording, the encode and decode circuit 140 encodes the recording information provided by the host computer into a pulse signal and inputs it to the laser controller 130. As a result of this, the laser light source 120 set at a particular recording power emits a predetermined laser light Z by pulse irradiation and its beam spot is incident upon the L3 recording layer 26 in order to record the information.

During the recording operation, the reflected light of the laser light Z through the half mirror 124 is converted into an electrical signal by the photo-detection device 126. With reference to the electrical signal, the focus controller 132, the tracking controller 134, and the linear controller 136 exercise control over the optical pickup 106 and the linear drive mechanism 108 whenever necessary. For example, the focus controller 132 continuously detects a focus error, and controls the lens drive coil 128 to move the objective lens 122 into focus in the direction of the optical axis when the beam spot on the L3 recording layer 26 goes out of focus. The tracking controller 134 detects the tracking error, that is, whether or not the beam spot correctly follows the groove 42. When the beam spot deviates from the groove 42, the tracking controller 134 controls the lens drive coil 128 and also moves the entire optical pickup 106 using the linear controller 136 in order to make the beam spot follow the groove 42. Therefore, it becomes possible to accurately record the information within the groove 42.

Subsequently, when the recording shifts from the L3 recording layer 26 to the L2 recording layer 24, the objective lens 122 is focus-controlled in the direction of the optical axis based on the position information recognized in advance, so as to focus the laser light Z on this L2 recording layer 24. The position information 62 is used in a similar manner, so that the focus of the laser light is approximately achieved from the beginning of the process. After that, the focus controller 132 detects an actual focus error (FE) based on an electrical signal sent from the photo-detection device 126 by reflected light and controls the drive of the lens drive coil 128 in the focus direction (the direction of the optical axis) with the use of the focus error. Then, a test recording operation is carried out on the L2 recording layer 24. Furthermore, after completion of the test, the optical pickup 106 is positioned on a target recording track to start recording from, and recording is then started with a designated recording density. In this way, recording and reading operations are carried out on and from the L0 to L3 recording layers 20, 22, 24, and 26.

According to the optical recording medium of the first embodiment, it is possible to achieve a quick focus on each of the recording layers 20, 22, 24, and 26 irrespective of the multilayer structure having three or more layers. In particular, since focus is achieved using the position information 62 that is actually recorded on the optical recording medium 1, high precision focus control can be exercised from the beginning of the process. By adopting the present embodiment, it is possible for a manufacturer to determine the position of each recording layer of the optical recording medium 1. As a result of this, flexibility in designing the optical recording medium 1 can be increased independently of the optical recording and reading apparatus 100. For example, as in the case of the present optical recording medium 1, if different respective individual manufacturers include some contrivance so as to change the interlayer distance between the recording layers 20, 22, 24, and 26, the optical recording and reading apparatus 100 can obtain the position of each of the recording layers 20, 22, 24, and 26 every time the optical recording medium 1 is changed, so that it becomes possible to precisely carry out the recording and reading operations.

For example, in an optical recording medium with three or more layers, there are many cases where, while information is read from a specific recording layer, reflected light from an adjacent recording layer may simultaneously get into the optical pickup 106 to produce noise and degrade the signal quality. Accordingly, a manufacturer may desire to keep a certain minimum distance between the layers in order to reduce crosstalk from the adjacent layer or layers. Furthermore, confocal crosstalk is caused by multiple reflections in an optical recording medium with three or more layers, therefore, manufacturers want to make a difference in the thickness of each spacer layer as much as possible. Moreover, if the recording layers are given different reflectivities, recording layers that adjoin a recording layer with the highest reflectivity (typically the L0 recording layer 20 which lies the farthest away from the light incident surface 38A) are preferably kept as far apart as possible since the intensity of the reflected light from this recording layer becomes high. As a result, the interlayer distance between the three or more layers in the optical recording medium 1 has to be determined in consideration of various factors such as the materials used in the recording layers and the spacer layers, and a surface treatment method of the light incident surface 38A.

As the recording layer are closer to the light incident surface 38A, the signal quality of the optical recording medium 1 sensitively changes due to dirt such as scratches, dust, fingerprints, and other stains on the light incident surface 38A. Accordingly, in order to stabilize the signal quality, the cover layer 36 also needs a minimum predetermined thickness. On the other hand, since any spherical aberration needs correcting in accordance with the depth of each recording layer from the light incident surface 38A, maintaining the interlayer distance between the recording layers has, to a certain degree, an upper limit in consideration of the range of spherical aberration correction achievable. When manufacturing the optical recording medium 1, a significant amount of warpage and tilt may occur in its outside shape, so that coma aberration due to a shape error becomes an important factor for determining disc structure. To be more specific, when $\lambda$ represents the wavelength of a laser, NA represents the numerical aperture of a lens, and t represents the thickness of a cover layer, the coma aberration $\propto (t \times NA^3)/\lambda$. An increase in the thickness t of the cover layer 36 proportionately increases the coma aberration and hence the thickness t has a large effect on the tilt margin.

Therefore, in the case of the optical recording medium 1 having three or more layers, the thicknesses of the cover layer and the spacer layer and the like have an extremely large effect on the signal quality. Accordingly, even if an optimal recording layer is developed, when the thicknesses of the cover layer and the spacer layer are fixed as standard, there may be a problem in that a recording layer with superior characteristics cannot be adopted because of a mismatch with these thicknesses.

In the case of the optical recording medium 1 having three or more layers as described above, it is, in fact, difficult to standardize the positions of the recording layers among a plurality of manufacturers. Thus, according to the present embodiment, even if the respective manufacturers design the thickness of their spacer layer or layers and the characteristics of their recording layers without restraint, the optical recording and reading apparatus 100 can still be fully compatible with them. As a result, it is possible to broaden the popularity of the high-performance optical recording medium 1.

In the present embodiment, the position information 62 is recorded on the basic recording layer (L0 recording layer) 20 positioned in the range of 90 µm to 110 µm away from the light incident surface so that the optical recording and reading apparatus 100 conforming to Blu-ray Disc standards can thus read the position information 62 without fail. Furthermore, the optical recording medium 1 contains the position information 62 of all recording layers recorded in the lead-in areas 94 of a plurality of recording layers 20, 22, 24, and 26 so as to multiplex the position information 62. Thus, even if the position information 62 cannot be read from a specific recording layer due to some issue, it is possible to read the position information 62 from another recording layer.

Figure 5:
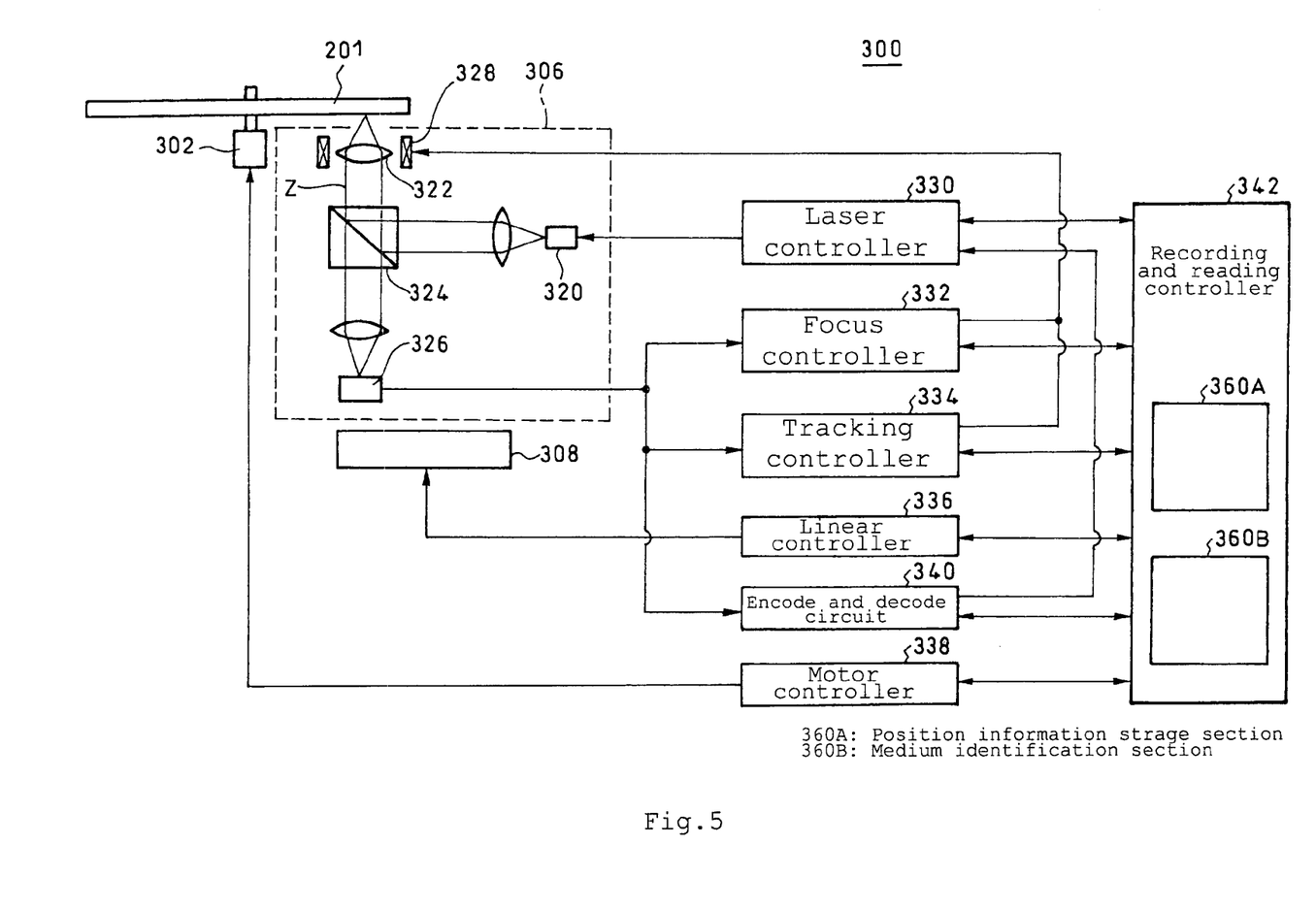
FIG. 5 is a diagram showing the general configuration of an optical recording medium and an optical recording and reading apparatus according to a second embodiment of the present invention.

An optical recording medium 201 according to a second embodiment of the present invention and an optical recording and reading apparatus 300 for practicing the recording and reading information on and from the optical recording medium 201 will now be described with reference to FIG. 5. In the following description and drawings of the optical recording medium 201 and the optical recording and reading apparatus 300, structures, members, and the like similar or identical to those of the optical recording medium 1 and the optical recording and reading apparatus 100 described in the first embodiment will be designated with reference numerals having the same two lower digits. A detailed description thereof will be omitted.

Figure 6:
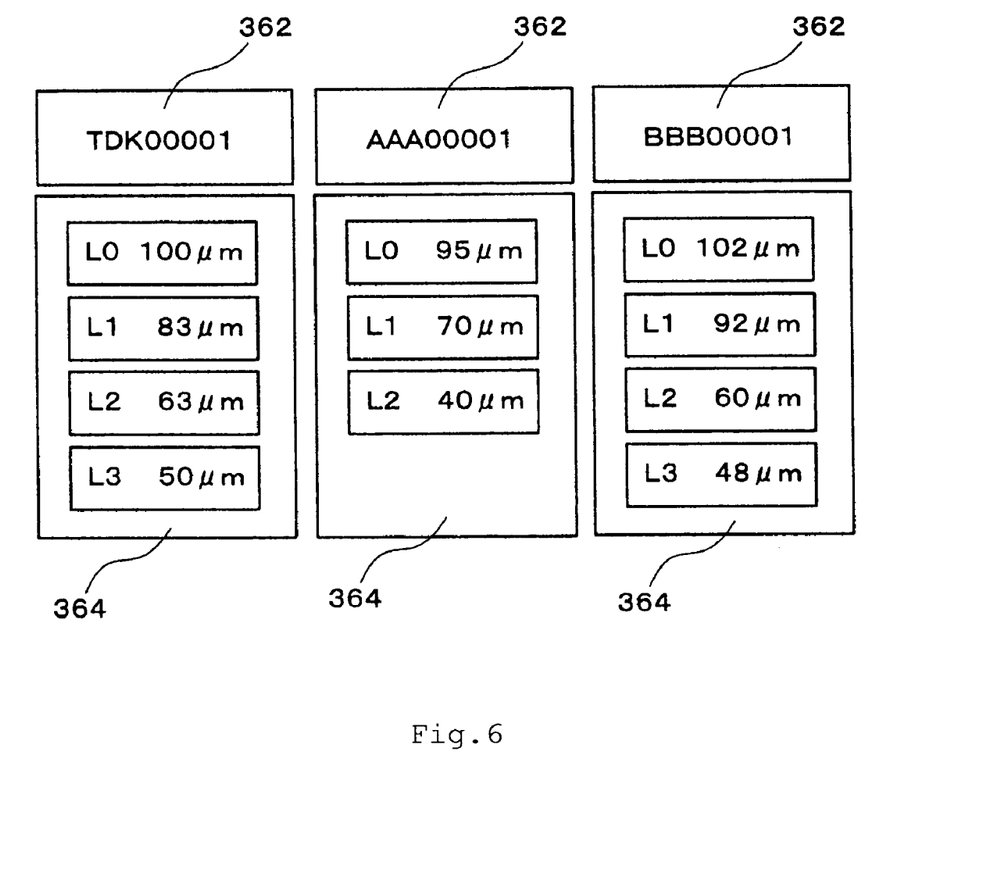
FIG. 6 is a diagram showing an example of medium identification information and position information to be held in the optical recording and reading apparatus.

In the optical recording and reading apparatus 300, a recording and reading controller 342 has a position information storage section 360A and a medium identification section 360B. As shown in FIG. 6, the position information storage section 360A stores medium identification information 362 on a plurality of optical recording media and position information 364 on the recording layers of the optical recording media corresponding to the medium identification information 362 in the storage means. The medium identification information 362 is manufacturer-provided information for identifying the type of optical recording medium. It is composed of identification information regarding the manufacturer itself, combined with ID or the like for identifying each individual recording medium. The position information 364 describes the positions of a plurality of recording layers included in each optical recording medium from a light incident surface. The medium identification information 362 and the position information 364 can be updated externally.

The medium identification section 360B reads medium identification information from an optical recording medium inputted from outside and then refers to the same medium identification information 362 stored in the position information storage section 360A and the position information 364 corresponding thereto based on the medium identification information. As a result, it is possible to recognize the positions of recording layers of the optical recording medium in advance.

The optical recording medium 201 will now be described. As in the first embodiment, the optical recording medium 201 is configured to include an L0 recording layer 220 being a basic recording layer, an L1 recording layer 222 being a first recording layer, an L2 recording layer 224 being a second recording layer, and an L3 recording layer 226 being a third recording layer. The distance from the light incident surface 238A to the L3 recording layer 226 is approximately 50 μm. The distance from the light incident surface 238A to the L2 recording layer 224 is approximately 63 μm. The distance from the light incident surface 238A to the L1 recording layer 222 is approximately 83 μm. The distance from the light incident surface 238A to the L0 recording layer 220 is approximately 100 μm. The L0 recording layer 220 being the basic recording layer is located at a position in the range of 90 μm to 110 μm away from the light incident surface 238A. The recording capacity of the L0 recording layer 220 is 25 GB. Thus, the basic recording layer complies with Blu-ray Disc standards.

Figure 7A:
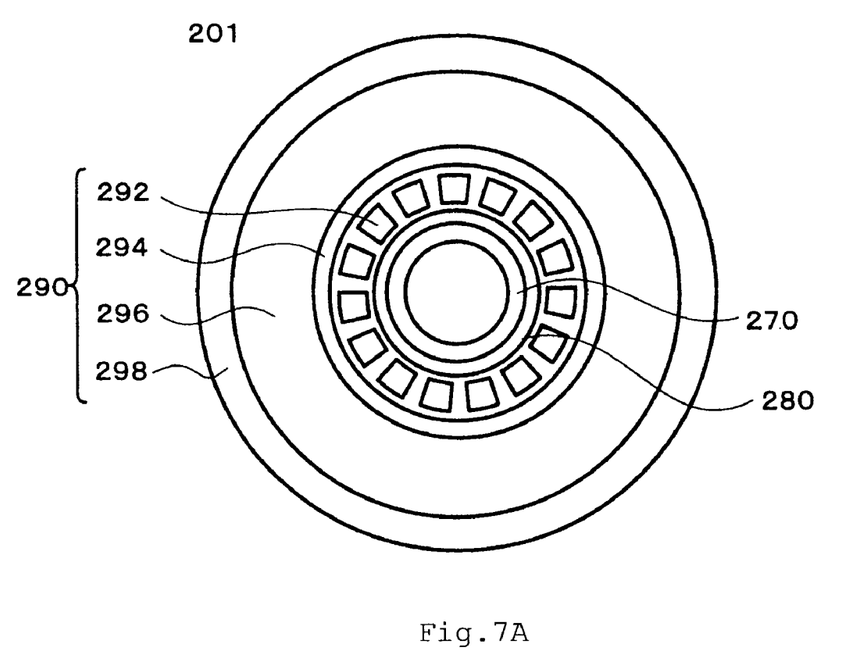
FIGS. 7A and 7B are diagrams showing the information holding form of the optical recording medium.

As shown in FIG. 7A, each of the recording layers 220, 222, 224, and 226 of the optical recording medium 201 is provided with a lead-in area 294, a data area 296, a lead-out area 298, and the like as an information area 290. The information area 290 of the L0 recording layer 220 alone has a burst cutting area (BCA) 292 on the innermost circumference.

Figure 7B:
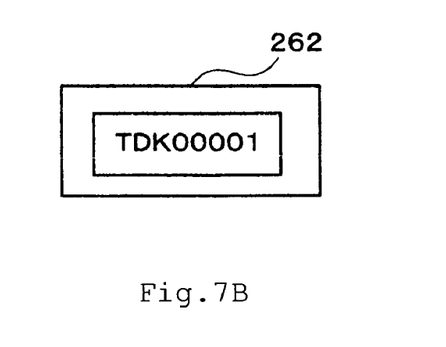

Furthermore, in the optical recording medium 201, medium identification information 262 is recorded on the BCAs 292 of the L0 recording layer 220 as shown in FIG. 7B. The medium identification information 262 is intended to identify both the manufacturer of the optical recording medium 201 and the type of individual optical recording medium. The medium identification information 262 is recorded on the BCAs 292 in this instance, however it may be recorded on the lead-in area 294 or on the lead-out area 298.

A method for recording and reading information on and from the optical recording medium 201 by the optical recording and reading apparatus 300 will now be described.

When recording information is input from a host computer to the recording and reading controller 342, the medium identification section 360B reads the BCAs 292 in the information area 290 of the L0 recording layer 220 in order to acquire the medium identification information 262. After that, the medium identification section 360B refers to the same medium identification information 362 stored in the position information storage section 360A and the position information 364 corresponding thereto based on the medium identification information 262. As a result, the optical recording and reading apparatus 300 can obtain the position information 364 of all the recording layers 220, 222, 224, and 226 of the optical recording medium 201 in advance.

When recording of the information is started on a target recording layer, the objective lens 322 is focus-controlled in the direction of the optical axis based on the position information 364 obtained in advance, so that laser light Z comes into focus on the recording layer. Using the position information 364 which is set on a medium-by-medium basis based on the medium identification information 262 of the optical recording medium 201 makes it possible to approximately achieve the focus from the beginning of the process. Then, the focus controller 332 detects an actual focus error (FE) based on an electrical signal sent from the photo-detection device 326 by reflected light and further precisely controls the drive of the lens drive coil 328 in a focus direction (the direction of the optical axis) with the use of the focus error. As a result, this can significantly reduce the focus time. Then, a test recording operation is carried out on the target recording layer. Also, after completion of the test, the optical pickup 306 is positioned on the target recording track to start recording from, and recording is then started.

According to the optical recording medium 201 of the second embodiment, since the optical recording and reading apparatus 300 can recognize the position information 364 of each of the recording layers 220, 222, 224, and 226 in advance irrespective of multilayer structure having three or more layers, it is possible to quickly achieve focus-control. In particular, the position information 364 can be acquired more quickly since the medium identification information 262 that is actually recorded on the optical recording medium 201 is collated along with the medium identification information 362 and the position information 364 which are recorded in the optical recording and reading apparatus 300. Since the medium identification information 262 includes only a small amount of information, it is possible to retain the medium identification information 262 in the BCAs 292 with high readout reliability. As a result, it becomes possible to further certainly obtain the position information 364 even if the recording layers have multilayer structure.

These embodiments described a method in which the position information itself which was set for every optical recording medium was directly used for carrying out focus control on the recording layer, but the present invention is not limited thereto. For example, after the optical recording medium is mounted on the optical recording and reading apparatus, the position information is extracted in a similar manner and then the optical pickup actually scans the optical recording medium in a thickness direction to obtain measurement positions of all the recording layers. Then, the foregoing position information is corrected with the use of the measurement positions in advance. It is also preferable to carry out the focus control on the recording layer using the corrected position information. When compared with a case where the optical recording medium is scanned without obtaining the position information, the accuracy of scanning is increased. As a result, it is also possible to consider a manufacturing error of the optical recording medium in advance by measurement. When focus is instantaneously shifted from one layer to another, difference from a designed value has not little effect, so that this method can reduce an actual error in shifting the focus.

Furthermore, in these embodiments, the position information recorded in the recording layer of the optical recording medium was the distance from the light incident surface, but the present invention is not limited thereto. For example, the distance from the basic recording layer may be used as the position information. In other words, any information forms are available as long as the optical recording and reading apparatus can obtain the position of each recording layer and carry out appropriate focus control by the information.

These embodiments has exclusively dealt with the cases in which the optical recording medium is of recordable type and when recording information on this optical recording medium. The present invention is not limited thereto, however, but can be applied to the cases in which the optical recording medium is of read only type and when reading this optical recording medium. That is, the present invention is not limited to the cases of recording information on an optical recording medium.

It should be appreciated that the optical recording medium and the optical recording and reading method according to the present invention are not limited to the foregoing embodiments, and various modifications may be made without departing from the gist of the present invention.

The present invention is applicable to various fields where laser light is used for recording and reading.

The entire disclosure of Japanese Patent Application No. 2006-349302 filed on 26 Dec. 2006 including specification, claims, drawings, and summary are incorporated herein by reference in its entirety.

What is claimed is:

1. An optical recording medium having three or more recording layers comprising:
   a basic recording layer arranged in a position that is in the range of 90 μm to 110 μm away from a light incident surface, with information being read from the basic recording layer by the irradiation of laser light from a laser light source that is incident on the light incident surface; and
   a plurality of recording layers arranged in parallel with the basic recording layer, with information being read from the recording layer by the irradiation of the laser light that is incident on the light incident surface through an objective lens with the same numerical aperture NA, from the same laser light source having the same wavelength, wherein
   all of the basic recording layer and the plurality of recording layers are compliant with the Blu-ray Disc standards and a Blu-ray Disc-format to provide Blu-ray Disc-formatted recording layers; and
   any one of the basic recording layer and the plurality of Blu-ray Disc-formatted recording layers has numerical values of position information of the plurality of Blu-ray Disc-formatted recording layers, which are recognized by a reading apparatus in advance collectively.

2. The optical recording medium according to claim 1, wherein the numerical values of the position information of the plurality of Blu-ray Disc-formatted recording layers is collectively recorded in a lead-in area or a lead-out area of any one of the basic recording layer and the plurality of recording layers.

3. The optical recording medium according to claim 1, wherein the numerical values of the position information of the plurality of Blu-ray Disc-formatted recording layers is collectively recorded in the basic recording layer.

4. The optical recording medium according to claim 1, wherein the numerical values of the position information of the plurality of Blu-ray Disc-formatted recording layers is collectively recorded in a lead-in area or a lead-out area of the basic recording layer.

5. A recording and reading method of an optical recording medium, in which an optical recording and reading apparatus for an optical recording medium stores medium identification information for identifying a plurality of optical recording media and position information of each of a plurality of recording layers of the optical recording medium in advance on memory means, the method comprising the steps of:
   when an optical recording medium having three or more of the recording layers all of which are compliant with the Blu-ray Disc standards and a Blu-ray Disc-format to provide Blu-ray Disc-formatted recording layers is mounted on the optical recording and reading apparatus, allowing the optical recording and reading apparatus to irradiate each of the Blu-ray Disc-formatted recording layers of the optical recording medium through an objective lens with the same numerical aperture NA with laser light by the same laser light source having the same wavelength in order to read out medium identification information stored on the recording layer in advance;
   allowing the optical recording and reading apparatus to refer to numerical values of the position information of three or more of the Blu-ray Disc-formatted recording layers stored collectively in the memory means based on the medium identification information; and
   allowing the optical recording and reading apparatus to carry out focus control on the recording layer based on the numerical values of the position information of three or more of the Blu-ray Disc-formatted recording layers in order to record or read information.

6. The recording and reading method of an optical recording medium according to claim 5, wherein the medium identification information is recorded in a burst cutting area of the Blu-ray Disc-formatted recording layer of the optical recording medium.

7. The recording and reading method of an optical recording medium according to claim 5, wherein the medium identification information is recorded in a basic recording layer which is arranged in a position that is in the range of 90 μm to 110 μm away from a light incident surface of the optical recording medium.

8. The recording and reading method of an optical recording medium according to claim 5, wherein the medium identification information is recorded in a burst cutting area of a basic recording layer which is arranged in a position that is in the range of 90 μm to 110 μm away from a light incident surface of the optical recording medium.

* * * * *